(No Model.)
F. O. KUNZ.
METHOD OF AND APPARATUS FOR MASHING AND COOKING GRAIN.
No. 311,590. Patented Feb. 3, 1885.
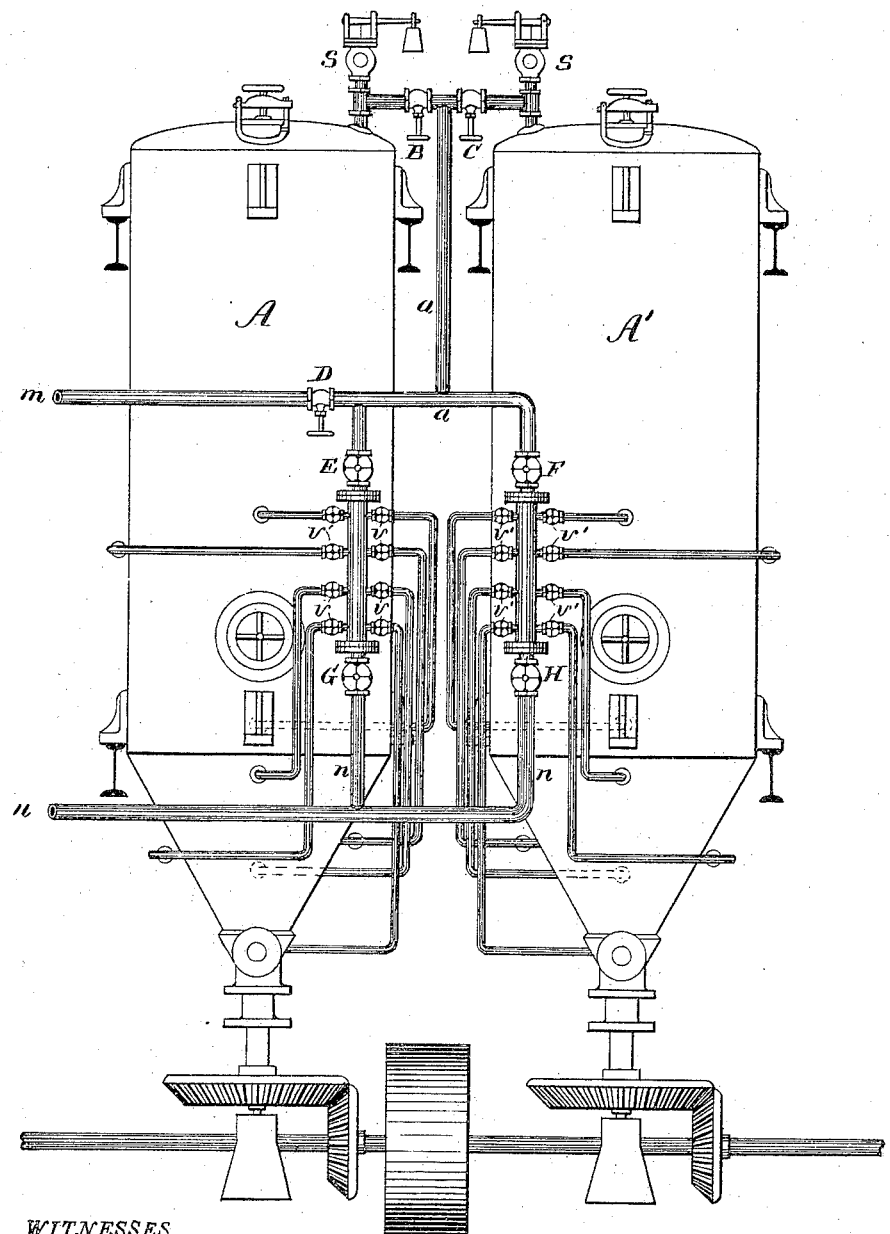
WITNESSES
C. J. Bell
O. A. Clark
INVENTOR
Frederick O. Kunz,
By Paine & Ladd,
Attorneys.

UNITED STATES PATENT OFFICE.

FREDERICK OTTO KUNZ, OF OMAHA, NEBRASKA, ASSIGNOR TO ILER & CO., OF SAME PLACE.

METHOD OF AND APPARATUS FOR MASHING AND COOKING GRAIN.

SPECIFICATION forming part of Letters Patent No. 311,590, dated February 3, 1885.

Application filed May 1, 1884. (No model.)

*To all whom it may concern:*

Be it known that I, FREDERICK O. KUNZ, a citizen of the United States, residing at Omaha, in the county of Douglas and State of Nebraska, have invented a certain new and useful Improved Method of and Apparatus for Mashing; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to an improved method of and apparatus for mashing grain for distilleries, breweries, &c.

In mash-cookers as heretofore constructed and used, after the cooking process is completed, the steam is blown off and allowed to escape. This not only causes a great waste of heat, and consequently of fuel, but the noise produced by the escaping steam is held to be a nuisance. The pressure used in the cooking apparatus is about fifty pounds per square inch, equal to 281° Fahrenheit. When the steam-pressure is withdrawn, the temperature is reduced to 212° Fahrenheit. This causes a waste for every pound of material of sixty-nine units of heat. If more or less pressure is used, the heat wasted is proportionately greater or less.

The object of my invention is to utilize this heat, which heretofore has been allowed to escape.

The invention consists, in part, of a compound mash-cooking apparatus, as hereinafter described, whereby the waste steam is used over again.

In the accompanying drawing, which shows a mash-cooking apparatus constructed according to my invention, A A' are two steam mash-cookers of any size or form.

I I' are the steam-distributing cylinders, (preferably of cast-iron,) provided with small valves $v\ v\ v'\ v'$, which divide the steam, so that it can be introduced into the cooker uniformly and thoroughly at different parts of the same, so as to get the best effect of the heat, and the two large valves G and E for cylinder I, and H and F for cylinder I', are for the admittance and discharge of steam to and from the cylinders.

S S are safety-valves.

The steam-inlet pipe $n$ is forked and communicates with both of the distributing-cylinders I I'. At the opposite ends of the distributing-cylinders the steam-pipes leading from them unite in a common pipe, $a$, which then forks, one branch leading into the cooker A, and the other into the cooker A', each being provided with a valve, B and C.

The pipe $m$ and valve D are for use when it is desired to empty both of the digesters.

The operation of the apparatus is as follows: The cylinder A is filled with the material to be cooked, and the valves B, C, E, and H being closed, the valve G is opened and steam is admitted through pipe $n$, distributer I, and valves $v\ v$ into the cylinder until the cooking is done. During this time the other cylinder A' is being filled with material to be cooked. The valves $v\ v$ and G are now closed and valves B F and $v'\ v'$ opened. The exhaust-steam from A passes through the pipe $a$ into the distributer I', and through valves $v'\ v'$ into A', until all the pressure is released. The valve F is then closed and H opened to admit live steam into the distributer I', to raise the pressure and temperature in A' to the proper point and to finish the cooking. During this time the cylinder A has been emptied and again filled, and the valve B and valves H and $v'\ v'$ (distributer I') are closed. To utilize the exhaust-steam from A' valves C and E are then opened, and the exhaust-steam passes through pipe $a$, distributer I, and valves $v\ v$ into A till the pressure is down, when valve E is closed and live steam is admitted through valve G, the distributer I, and valves $v\ v$ into A, and so on alternately, each cylinder being used in turn and the steam exhausted from one into the other.

Having thus described my invention, what I claim as new, and desire to secure by Letters Patent, is—

1. The improved method herein described of mashing, consisting of admitting steam to a suitable chamber or receptacle containing the grain, then withdrawing said steam to a second chamber or receptacle containing grain, and admitting to the latter chamber or receptacle sufficient additional steam to raise the temperature of the reused steam, substantially as set forth.

2. The combination, with the two cooking-cylinders of a double mash-cooking apparatus, of two distributing-cylinders, each having a number of pipes leading to different points of one of the cooking-cylinders, and a steam-pipe independent of said distributing-pipes, and connecting with the upper part of the other cylinder, together with a steam-inlet pipe communicating with both distributing-cylinders, substantially as described, and for the purpose set forth.

3. The combination, with the two cooking-cylinders of a double mash-cooking apparatus, of a steam-distributing cylinder having a steam-inlet pipe, a number of pipes leading to different points of one of the cooking-cylinders, and a steam-pipe independent of said distributing-pipes connecting with the upper part of the other cooking-cylinder, substantially as described, and for the purpose set forth.

In testimony whereof I affix my signature in presence of two witnesses.

FREDERICK OTTO KUNZ.

Witnesses:
HENRY C. AKIN,
S. S. AUCH MORAY.